(12) United States Patent
Sun et al.

(10) Patent No.: US 7,210,286 B2
(45) Date of Patent: May 1, 2007

(54) METHOD AND SYSTEM FOR CONTROLLING FUEL INCLUDED WITHIN EXHAUST GASES TO FACILITATE REGENERATION OF A PARTICULATE FILTER

(75) Inventors: Min Sun, Winsor (CA); Zornitza Pavlinova Pavlova-MacKinnon, Farmington Hills, MI (US); Kevin Dean Sisken, Saline, MI (US)

(73) Assignee: Detroit Diesel Corporation, Detroit, MI (US)

( * ) Notice: Subject to any disclaimer, the term of this patent is extended or adjusted under 35 U.S.C. 154(b) by 47 days.

(21) Appl. No.: 11/017,161

(22) Filed: Dec. 20, 2004

(65) Prior Publication Data

US 2006/0130464 A1 Jun. 22, 2006

(51) Int. Cl.
F01N 3/00 (2006.01)
F01N 3/02 (2006.01)

(52) U.S. Cl. ............................ 60/295; 60/297; 60/311

(58) Field of Classification Search ................ 60/295, 60/297, 311
See application file for complete search history.

(56) References Cited

U.S. PATENT DOCUMENTS

| | | | |
|---|---|---|---|
| 3,828,555 A * | 8/1974 | Capdevielle ................. 60/413 |
| 4,322,387 A * | 3/1982 | Virk et al. ................... 422/174 |
| 4,677,823 A | 7/1987 | Hardy |
| 4,719,751 A | 1/1988 | Kume et al. |
| 4,730,455 A | 3/1988 | Pischinger et al. |
| 4,747,264 A | 5/1988 | Santiago et al. |
| 4,897,096 A | 1/1990 | Pischinger et al. |
| 5,028,405 A | 7/1991 | Erdmannsdoerfer et al. |
| 5,042,248 A | 8/1991 | Abthoff et al. |
| 5,044,158 A * | 9/1991 | Goerlich ...................... 602/274 |
| 5,193,340 A * | 3/1993 | Kamihara ...................... 60/286 |
| 5,207,990 A * | 5/1993 | Sekiya et al. ................ 422/183 |
| 5,277,025 A * | 1/1994 | Gonze et al. ................... 60/274 |
| 5,557,923 A | 9/1996 | Bolt et al. |
| 5,826,425 A | 10/1998 | Sebastiano et al. |
| 5,854,990 A * | 12/1998 | Reckzugel et al. .......... 701/101 |
| 5,956,944 A | 9/1999 | Dementhon et al. |
| 6,176,896 B1 | 1/2001 | Dementhon et al. |
| 6,264,106 B1 * | 7/2001 | Bridgelall .............. 235/462.46 |
| 6,304,815 B1 * | 10/2001 | Moraal et al. ............... 701/115 |
| 6,347,513 B2 | 2/2002 | Pfleger et al. |
| 6,349,707 B1 | 2/2002 | Neumann et al. |
| 6,374,812 B1 | 4/2002 | Wiese |
| 6,397,584 B2 | 6/2002 | Salvat et al. |
| 6,574,956 B1 | 6/2003 | Moraal et al. |
| 6,615,577 B2 * | 9/2003 | Meyer et al. ................... 60/276 |
| 6,615,580 B1 | 9/2003 | Khair et al. |
| 6,622,480 B2 | 9/2003 | Tashiro et al. |
| 6,632,764 B2 | 10/2003 | Druckhammer et al. |
| 6,640,540 B2 * | 11/2003 | Sato et al. ..................... 60/297 |
| 6,666,020 B2 | 12/2003 | Tonetti et al. |
| 6,698,192 B2 | 3/2004 | Ootake |
| 6,708,487 B2 * | 3/2004 | Morimoto et al. ............ 60/311 |
| 6,722,120 B2 | 4/2004 | Plote |

(Continued)

Primary Examiner—Thomas Denion
Assistant Examiner—Loren Edwards
(74) Attorney, Agent, or Firm—Brooks Kushman P.C.

(57) ABSTRACT

Method, system, and controller for controlling fuel included within exhaust gases to facilitate regeneration of a particulate filter. The method, system, and controller being applicable in systems having an engine which emits exhaust gases having particulates which are captured by the particulate filter.

19 Claims, 2 Drawing Sheets

U.S. PATENT DOCUMENTS

| | | |
|---|---|---|
| 6,735,941 B2 | 5/2004 | Saito et al. |
| 6,742,328 B2 | 6/2004 | Webb et al. |
| 6,742,331 B2 | 6/2004 | Minami |
| 6,756,904 B2 | 6/2004 | Kinugawa et al. |
| 6,758,039 B2 | 7/2004 | Kuboshima et al. |
| 6,769,246 B2 | 8/2004 | Strohmaier et al. |
| 6,901,751 B2 * | 6/2005 | Bunting et al. ............... 60/297 |
| 6,948,311 B2 * | 9/2005 | Schaller et al. ............... 60/286 |
| 7,025,810 B2 * | 4/2006 | Crawley et al. ............... 95/278 |
| 2001/0010152 A1 | 8/2001 | Tallec et al. |
| 2002/0033017 A1 | 3/2002 | Bruggemann et al. |
| 2002/0112472 A1 | 8/2002 | Tashiro et al. |
| 2002/0128146 A1 | 9/2002 | Druckhammer et al. |
| 2002/0157383 A1 | 10/2002 | Bouchez et al. |
| 2002/0178922 A1 | 12/2002 | Ohno et al. |
| 2002/0189235 A1 | 12/2002 | Meyer et al. |
| 2002/0194843 A1 | 12/2002 | Ootake |
| 2003/0029427 A1 | 2/2003 | Esteghlal |
| 2003/0033800 A1 | 2/2003 | Tonetti et al. |
| 2003/0089102 A1 | 5/2003 | Colignon et al. |
| 2003/0089103 A1 | 5/2003 | Hahn et al. |
| 2003/0106303 A1 | 6/2003 | Plote |
| 2003/0106308 A1 | 6/2003 | Gabe et al. |
| 2003/0115858 A1 | 6/2003 | Hahn et al. |
| 2003/0124031 A1 | 7/2003 | Dionnet et al. |
| 2003/0126858 A1 | 7/2003 | Strohmaier et al. |
| 2003/0136117 A1 | 7/2003 | Megas |
| 2003/0140621 A1 * | 7/2003 | Khair et al. ................... 60/286 |
| 2003/0140623 A1 | 7/2003 | Ootake |
| 2003/0145581 A1 | 8/2003 | Tashiro et al. |
| 2003/0145582 A1 | 8/2003 | Bunting et al. |
| 2003/0167756 A1 | 9/2003 | Szymkowicz |
| 2003/0182936 A1 | 10/2003 | Kitahara |
| 2003/0188518 A1 | 10/2003 | Itoyama et al. |
| 2003/0188527 A1 | 10/2003 | Patterson et al. |
| 2003/0200745 A1 | 10/2003 | van Nieuwstadt et al. |
| 2003/0200746 A1 | 10/2003 | Saito et al. |
| 2003/0209010 A1 | 11/2003 | Arnold |
| 2003/0213235 A1 | 11/2003 | Kitahara et al. |
| 2003/0221421 A1 | 12/2003 | Gui et al. |
| 2003/0221423 A1 | 12/2003 | Kosaka et al. |
| 2003/0230060 A1 | 12/2003 | Yahata et al. |
| 2003/0230076 A1 * | 12/2003 | Kwon ........................ 60/295 |
| 2003/0230077 A1 | 12/2003 | Kuboshima et al. |
| 2003/0230078 A1 | 12/2003 | Yahata et al. |
| 2003/0230079 A1 | 12/2003 | Kuboshima et al. |
| 2004/0000139 A1 * | 1/2004 | Kawashima et al. .......... 60/295 |
| 2004/0011030 A1 | 1/2004 | Braun et al. |
| 2004/0020194 A1 | 2/2004 | Nishimura et al. |
| 2004/0031262 A1 | 2/2004 | Gui et al. |
| 2004/0055279 A1 | 3/2004 | Plote |
| 2004/0074225 A1 | 4/2004 | Schaller et al. |
| 2004/0098977 A1 | 5/2004 | Kupe et al. |
| 2004/0098979 A1 | 5/2004 | Hammerle et al. |
| 2004/0103648 A1 | 6/2004 | Opris et al. |
| 2004/0103654 A1 | 6/2004 | Ohtake et al. |
| 2004/0134187 A1 | 7/2004 | Inoue et al. |
| 2004/0139729 A1 | 7/2004 | Taylor, III et al. |
| 2004/0139733 A1 | 7/2004 | Koga et al. |
| 2004/0144069 A1 | 7/2004 | Gabe et al. |
| 2004/0144083 A1 | 7/2004 | Ament |
| 2004/0144087 A1 | 7/2004 | Kondou et al. |
| 2004/0159097 A1 | 8/2004 | Uematsu et al. |
| 2004/0172935 A1 | 9/2004 | Otake et al. |
| 2004/0200213 A1 * | 10/2004 | Igarashi et al. ............... 60/295 |
| 2005/0000209 A1 * | 1/2005 | Takahashi et al. ............ 60/286 |
| 2005/0150220 A1 | 7/2005 | Johnson et al. |

\* cited by examiner

METHOD AND SYSTEM FOR CONTROLLING FUEL INCLUDED WITHIN EXHAUST GASES TO FACILITATE REGENERATION OF A PARTICULATE FILTER

BACKGROUND OF THE INVENTION

1. Field of the Invention

The present invention relates to systems and methods for controlling fuel included within exhaust gases to facilitate regeneration of a particulate filter.

2. Background Art

A particulate filter is a device for capturing particulates emitted in exhaust gases from a combustion engine. In some systems employing a particulate filter, it may be desired to oxidize or burn the capture particulates in a process commonly referred to as regeneration. The regeneration of the particulates is dependent on temperatures at the particulate filter, which may be influence by exhaust gas fuel levels.

Accordingly, a need exists to control exhaust gas fuel levels so as to facilitate regeneration of particulates captured with a particulate filter.

SUMMARY OF THE INVENTION

One non-limiting aspect of the present invention relates to determining an amount of fuel to included within exhaust gases to facilitate regeneration of a particulate filter used to capture particulates emitted from an engine.

In accordance with one non-limiting aspect of the present invention, the amount of fuel to include within the exhaust gases may be determined by a controller and the controller may be configured to control system components to inject or otherwise included the fuel within the exhaust gases, such as by controlling fuel injection from a doser, fuel emitted with exhaust gases from the engine, and the like.

In accordance with one non-limiting aspect of the present invention, the amount of fuel included within the exhaust gases may be determined as function of an open loop fuel injection control strategy and a closed loop fuel injection control strategy wherein the closed loop fuel injection control strategy fine tunes the amount of fuel injected according to the open loop control strategy.

In accordance with one non-limiting aspect of the present invention, the closed loop control strategy determines an amount of the fuel to include within the exhaust gas based on sensing temperatures at the particulate filter such that the closed loop control strategy adds more fuel to the amount of fuel determined according to the open loop control strategy if the sensed temperature is less than a desired temperature and subtracts fuel from the amount of fuel determined according to the open loop control strategy if the sensed temperature is greater than the desired temperature.

In accordance with one non-limiting aspect of the present invention, the close loop control strategy may compensate for sensor delay associated with sensing the temperature at the particulate filter, such as to compensate for sensor delays caused by thermal inertia and the like.

In accordance with one non-limiting aspect of the present invention, the amount of fuel included within the exhaust gases may be determined as a function of an open loop emissions control strategy which limits fuel included within the exhaust gases so as to prevent slippage of unburned fuel out of the particulate filter and into to the environment.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
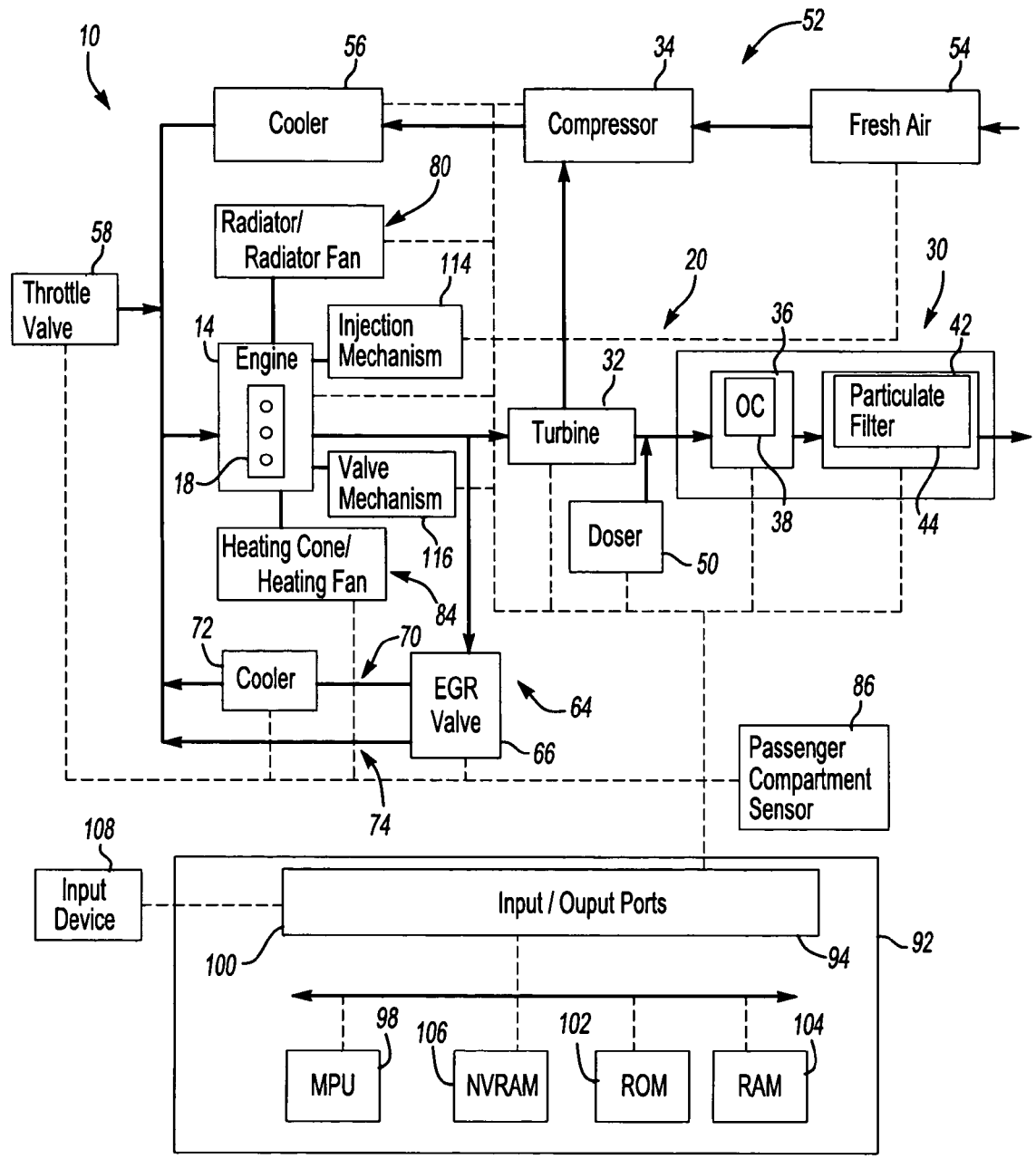
FIG. 1 illustrates a system in accordance with one non-limiting aspect of the present invention.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with an spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbocompound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions therebetween to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming fuel charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an air cooler 72, and an EGR non-cooler bypass 74. The EGR value 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant therethrough. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 invention may operate in conjunction with a heating system 84. The heating system 84 may include a heating cone, a heating fan, and a heater valve. The heating cone may receive heated coolant fluid from the engine 14 through the heater valve so that the heating fan, which may be electrically controllable by occupants in a passenger area or cab of a vehicle, may blow air warmed by the heating cone to the passengers. For example, the heating fan may be controllable at various speeds to control an amount of warmed air blown past the heating cone whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, such as regeneration system controller, may be configured for determining a desired exhaust gas temperature at the particulate filter and/or a particulate filter substrate temperature to facilitate regeneration of the particulate filter whereby particulates captured by the particulate filter are oxidized or otherwise burned. The disposal of the particulates in this manner may be advantageous to prevent clogging and filling of the particulate filter so that the exhaust gases may pass therethrough with minimal restriction and yet permit additional particulates to be collected.

In accordance with one non-limiting aspect of the present invention, the controller 92, or the regeneration controller, may be configured to determine an amount of fuel to be included within the exhaust gases as a function of the desired temperature, such as with fuel injection from the doser 50, with fuel emitted from the engine 14, or otherwise. In more detail, the present invention contemplates controlling amounts of fuel included within the exhaust gases so as to facilitate combustion of the fuel at the OC 38, and thereby, temperatures at the particulate filter 44. The use of fuel injection to control temperatures at the particulate filter 44 in this manner is advantageous to achieving the desired temperatures at the particulate filter 44 and thereby the desired particulate filter regeneration. For exemplary purposes, the description below relates to controlling fuel injected from the doser, however, the present invention, as described above, is not intended to be so limited and contemplates any number of other features for providing fuel into the exhaust gases, including controlling engine fuel injection and valve timing so as to control fuel emitted with the engine exhaust gases.

Figure 2:
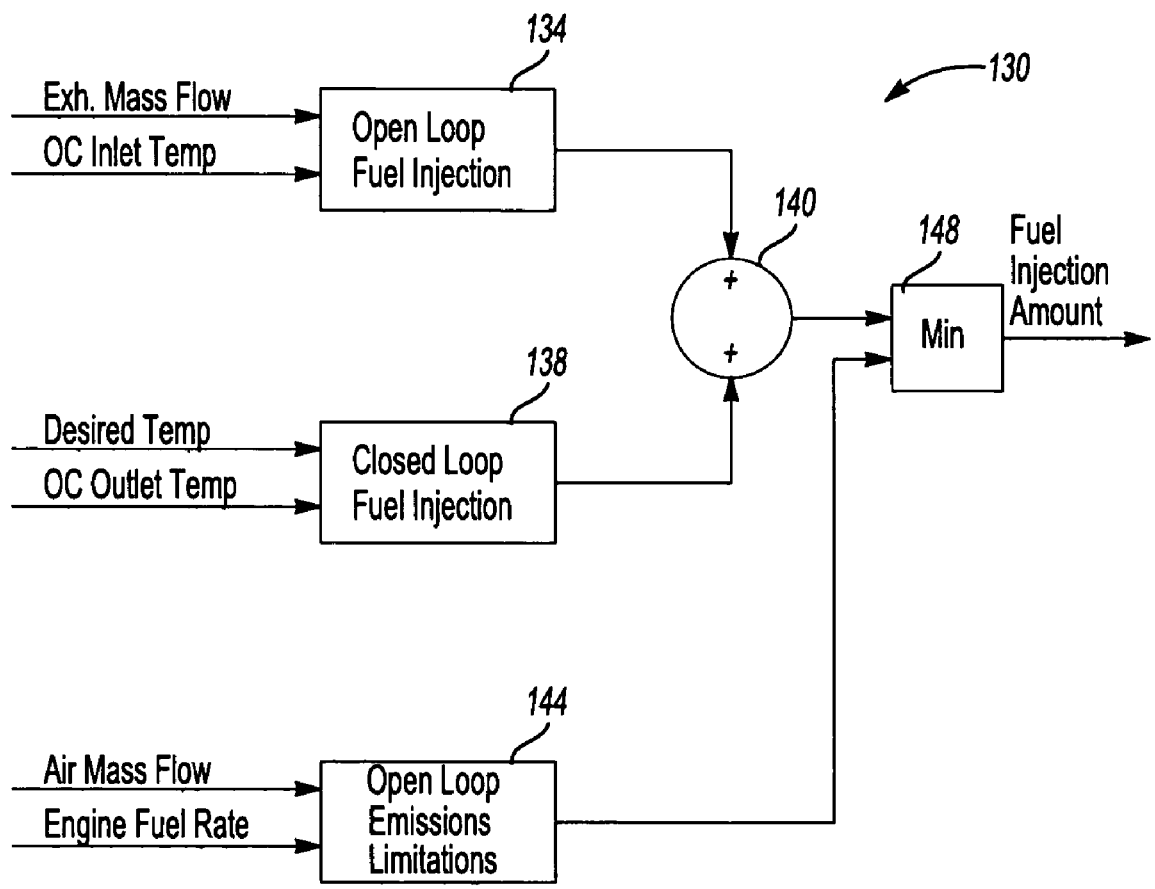
FIG. 2 illustrates a flowchart of a method for controlling fuel included within exhaust gases to facilitate regeneration of a particulate filter in accordance with one non-limiting aspect of the present invention.

FIG. 2 illustrates a flowchart 130 of a method for controlling fuel injection included within the exhaust gases to facilitate regeneration of a particulate filter in accordance with one non-limiting aspect of the present invention. The method may relate to controlling an amount of fuel injected from a doser, and amount of fuel ejected from the engine with the exhaust gases, and/or fuel injected into the exhaust gases from other features not described above. In general, the method relates to determining the amount of fuel according to an open loop fuel injection control strategy and adjusting the amount of injected fuel with one or both of a closed loop fuel injection control strategy and an open loop emissions control strategy.

Block 134 relates to determining a first fuel injection value as a function of an open loop fuel injection control strategy. In accordance with one non-limiting aspect of the present invention, the open loop fuel injection control strategy determines the first fuel injection value as a function of exhaust gas mass flow and inlet exhaust temperatures of the OC, which may be determined with sensors and/or calculated. Of course, the present invention contemplates the use of other inputs to determine the first fuel injection value.

In more detail, the open loop control strategy may be characterized as a process wherein a look-up table or algorithm is utilized to determined the first fuel injection value as a function of the input variables. This type of open loop fuel control is advantageous because it allows rapid responses and updates to fuel injection, which is especially advantageous during transient conditions when the amount of fuel must be rapidly adjusted to compensate for changes in operation. The look-up table or other logic may be based on desired OC outlet temperatures associated with regeneration of the particulate filter such that the input variables are correlated with doser fuel quantities that are likely to produce the desired OC outlet temperatures. For example, the desired OC outlet temperatures may be based on the material properties and characteristics of the particulate filter so that the temperatures of the exhaust gases flowing out of the OC and to the particulate filter are sufficient to regenerate the particulate filter, which may require temperatures around 550° C. and above.

Block 138 relates to determining a second fuel injection value as a function of a closed loop fuel injection control strategy. In accordance with one non-limiting aspect of the present invention, the closed loop fuel control strategy determines the second fuel injection value as a function of sensed outlet exhaust gas temperatures of the OC being adjusted to compensate for sensor delay, whereby the second doser value is then determined as function of a difference between the adjusted, sensed OC outlet temperature and the desired OC outlet temperature required to facilitate regeneration of the particulate filter. Of course, the present invention contemplates the use of other inputs to determine the second fuel injection value.

In more detail, the closed loop control strategy may be characterized as a multi-step process that firstly adjusts the sensed OC outlet temperature to compensate for sensor delay, secondly determines a difference between the adjusted OC outlet temperature value and the desired OC outlet temperature value, and thirdly determines the second doser value as a function of the difference, which may be determined from a look-up table or through other logic that correlates fuel injection quantities as a function of the different between the adjusted, sensed OC outlet temperature and the desired OC outlet temperature. As described below in more detail, any difference in temperature between the desired OC outlet temperature and that associated with the first doser injection amount is compensated for by using the second fuel injection value to add or subtract from the amount of fuel injected by the doser.

Furthermore, because sensor delays in sensing the OC outlet temperature, such as those caused by thermal inertia of the sensor and the like, may limit the ability to rapidly adjust the first fuel injection value with the second fuel injection value, the present invention takes this delay into consideration and determines the second fuel injection value as a function thereof. For example, and in accordance with one non-limiting aspect of the present invention, the adjusted OC outlet temperature is determined according to the following equation:

$$Ta = \tau * dTsensed/dt + Tsensed$$

wherein: Ta is the adjusted, sensed OC outlet temperature; Tsensed is the sensed OC outlet temperature; and t is a heat transfer coefficient of the OC.

Block 140 relates to adjusting the first fuel injection value as a function of the second fuel injection value. In accordance with one non-limiting aspect of the present invention, the adjusting may be performed in a summing operation wherein the second fuel injection value is added or subtracted from the first fuel injection value depending on whether the second fuel injection value is negative (indicating the sensed OC outlet temperature is greater than the desired OC outlet temperature and therefore less fuel is needed) or positive (indicating the sensed OC outlet temperature is less than the desired OC outlet temperature and therefore more fuel is needed).

In accordance with one non-limiting aspect of the present invention, the use of the second fuel injection value to adjust the first fuel injection value may be limited to steady-state operation where rapid responses to changing operation conditions may be limited. Of course, the present invention is not intended to be limited to steady-state operation and contemplates that steady-state operation may be determined according to any number of parameters, such as by defining at time period in which the first fuel injection value must output a value within a predefined range and the like.

Block 144 relates to determining a third fuel injection value as a function of an open loop emissions fuel injection control strategy. In accordance with one non-limiting aspect of the present invention, the open loop emissions fuel injection control strategy determines the third fuel injection value as a function of air mass flow to the engine and engine fuel rates. Of course, the present invention contemplates the use of other inputs to determine the third fuel injection value.

In more detail, the open loop emissions fuel injection control strategy may be characterized as a process wherein a look-up table, algorithm, or the like is utilized to determined the third fuel injection value as a function of the input variables. This type of open loop fuel control is advantageous because it allows rapid responses and updates to fuel injection, which is especially advantageous during transient conditions when the amount of fuel injected from the doser must be rapidly adjusted to compensate for changes in operation.

The emissions control strategy look-up table or other logic may be utilized to adjust the amount of fuel to inject from the doser as a function of oxygen content in the exhaust gases so as to limit slippage of fuel into the environment. In particular, and in accordance with one non-limiting aspect of the present invention, the third fuel injection value corresponds with a maximum amount of fuel to injected from the doser given the air mass flow and engine fuel rates. These values may be determined according to any number of parameters and may generally relate to benchmarked or other empirically determined parameters associated with fuel slippage. Of course, the present invention contemplates determining such values according to any number of means and is not intended to be limited to a look-up table or any other open loop control strategy.

Block 148 relates to determining an amount of fuel to include within the exhaust gases as a function of the adjusted first fuel injection and the third fuel injection value in accordance with one aspect of the present invention. In accordance with one non-limiting aspect of the present invention, the amount of fuel to injected from the doser may be the lesser of the adjusted first fuel injection value and the third fuel injection value so as to prevent slippage of fuel into the environment.

As described above, the present invention contemplates utilizing the closed loop fuel injection control strategy to fine tune or otherwise adjust the amount of fuel injected according to the open loop fuel injection control strategy so that fuel may be controllable injected into the exhaust gases to control temperatures within the particulate filter canister, such as to generate temperatures approximately equal to, and in some cases without substantially surpassing, the desired OC outlet temperature so as to facilitate regeneration and prevent heat damage to the particulate filter.

In accordance with one non-limiting aspect of the present invention, the dichotomy between open and closed loop control is characterized by the open loop control receiving variable inputs and determining an output therefrom without additional variables adjusting or otherwise influencing the output. In contrast, the closed loop control receives variable inputs and compares the inputs to a desired or set-point standard prior to determining the output.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of determining an amount of fuel to include within exhaust gases to facilitate regeneration of a particulate filter, the particulate filter being in fluid communication with an engine to capture particulates emitted in exhaust gases therefrom, the method comprising:
determining a first fuel injection value as a function of an open loop fuel injection control strategy;
determining a second fuel injection value as a function of a closed loop fuel injection control strategy;
adjusting the first fuel injection value as a function of the second fuel injection value;
determining a third fuel injection value as function of an open loop emissions fuel injection control strategy; and
determining the amount of fuel to include within the exhaust gases to facilitate regeneration of the particulate filter as a function of the adjusted first fuel injection value and the third fuel injection value.

2. The method of claim 1 further comprising determining the amount of fuel to include within the exhaust gases to be the adjusted first fuel injection value if the adjusted first fuel injection value is less than the third fuel injection value.

3. The method of claim 1 further comprising determining the amount of fuel to include within the exhaust gases to be the third fuel injection value if the adjusted first fuel injection value is greater than the third fuel injection value.

4. The method of claim 1 further comprising determining the first fuel injection value as a function of exhaust gas mass flow and inlet temperatures of an oxidation catalyst (OC), the OC being in communication with the particulate filter to oxidize fuel included within the exhaust gases.

5. The method of claim 1 further comprising determining the second fuel injection value as a function of outlet temperatures of an oxidation catalyst (OC), the OC in communication with the particulate filter to oxidize fuel included within the exhaust gases.

6. The method of claim 5 further comprising sensing the outlet temperature of the OC and adjusting the sensed OC outlet temperature to compensate for sensor delay, and wherein the second fuel injection value is determined as a function of a difference between the adjusted OC outlet temperature and a desired OC outlet temperature.

7. The method of claim 6 further comprising determining the desired outlet temperature as a function of temperatures desired to facilitate regeneration of the particulate filter.

8. The method of claim 6 further comprising determining the adjusted OC outlet temperature according to the following equation:

$$Ta = \tau * dTsensed/dt + Tsensed$$

wherein: Ta is the adjusted OC outlet temperature, Tsensed is the sensed outlet temperature of the OC and τ is a heat transfer coefficient of the OC.

9. The method of claim 1 further comprising adjusting the first fuel injection value as a function of the second fuel injection value by adding the second fuel injection value to the first fuel injection value.

10. The method of claim 1 further comprising determining the third fuel injection value as a function of air mass flow into the engine and engine fuel rate.

11. A method of determining an amount of fuel to include within exhaust gases to facilitate regeneration of a particulate filter having an oxidation catalyst (OC), the particulate filter being in fluid communication with an engine to capture particulates emitted in exhaust gases therefrom, the method comprising:
controlling fuel included within the exhaust gases during regeneration of the particulate filter according to an open loop control strategy, the open loop control strategy determining an amount of fuel to include within the exhaust gases as a function of exhaust gas mass flow rate to the particulate filter assembly and exhaust gas temperature at an inlet to the OC; and
adjusting the amount of fuel included within the exhaust gases according to a closed loop control strategy, the closed loop control strategy employing a sensor to sense OC outlet temperatures and adjusting the amount of fuel included within the exhaust gases as a function of the sensed OC outlet temperatures being corrected to compensate for sensor delay and a difference between the corrected OC outlet temperature and a desired OC outlet temperature, the desired OC outlet temperature associated with temperatures desired to facilitate regeneration of the particulate filter.

12. The method of claim 11 further comprising adjusting the amount of fuel included within the exhaust gases according to the closed loop control strategy if the engine is determined to be running under steady-state operation.

13. The method of claim 12 further comprising determining the engine to be running under steady-state operation if the open loop control strategy determines the amount of the fuel to be included within the exhaust gases to be within a predefined range for a predefined period of time.

14. The method of claim 11 further comprising adjusting the amount of fuel included within the exhaust gases according to an open loop emissions control strategy, the open loop emissions control strategy adjusting the amount of fuel to be included within the exhaust gases as a function of oxygen content in the exhaust gases so as to limit slippage of unburned fuel into the environment.

15. The method of claim 14 further comprising determining the oxygen content as a function of air mass flow into the engine and engine fuel rate.

16. The method of claim 11 further comprising determining the corrected OC outlet temperature according to the following equation:

$$Ta = \tau * dTsensed/dt + Tsensed$$

wherein: Ta is the adjusted OC outlet temperature, Tsensed is the sensed outlet temperature of the OC and τ is a heat transfer coefficient of the OC.

17. A controller for controlling fuel injected from a doser to a particulate filter assembly having an oxidation catalyst (OC) to facilitate regeneration of particulates emitted from an internal combustion engine and captured by a particulate filter, the controller configured for:
controlling the doser to inject fuel during regeneration of the particulate filter according to an open loop control strategy;
adjusting the amount of fuel injected from the doser according to a closed loop control strategy;

wherein the closed loop control strategy employs a sensor to sense OC outlet temperatures and adjusts the amount of fuel injected from the doser as a function of the sensed OC outlet temperatures being corrected to compensate for sensor delay and a difference between the corrected OC outlet temperature and a desired OC outlet temperature, the desired OC outlet temperature associated with temperatures desired to facilitate regeneration of the particulate filter.

18. The controller of claim 17 wherein the open loop control strategy determines an amount of fuel to inject from the doser as a function of exhaust gas mass flow rate to the particulate filter assembly and exhaust gas temperature at an inlet to the OC.

19. The controller of claim 17 further comprising determining a third fuel injection value has a function of an open loop admissions fuel injection control strategy and further adjusting the amount of fuel injected from the doser according to the same.

* * * * *